(12) United States Patent
Azzam et al.

(10) Patent No.: US 10,140,344 B2
(45) Date of Patent: Nov. 27, 2018

(54) EXTRACT METADATA FROM DATASETS TO MINE DATA FOR INSIGHTS

(71) Applicant: Microsoft Technology Licensing, LLC, Redmond, WA (US)

(72) Inventors: Saliha Azzam, Redmond, WA (US); Youssef El Fassy Fihry, Redmond, WA (US); Yuva Priya Manoharan, Redmond, WA (US); Steven Paul Breyer, Medina, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 245 days.

(21) Appl. No.: 14/995,065

(22) Filed: Jan. 13, 2016

(65) Prior Publication Data

US 2017/0199913 A1   Jul. 13, 2017

(51) Int. Cl.
*G06F 17/30* (2006.01)

(52) U.S. Cl.
CPC .............. *G06F 17/30539* (2013.01)

(58) Field of Classification Search
CPC .......... G06F 17/30539; G06F 17/3053; G06F 17/30867
See application file for complete search history.

(56) References Cited

U.S. PATENT DOCUMENTS

| 6,493,663 | B1 | 12/2002 | Ueda |
| 6,496,814 | B1 | 12/2002 | Busche |
| 7,225,200 | B2 | 5/2007 | Chickering et al. |
| 7,424,439 | B1 * | 9/2008 | Fayyad .............. G06Q 30/0204 |
| | | | 705/7.33 |
| 8,090,747 | B2 | 1/2012 | Kleinberg et al. |
| 2002/0178152 | A1 | 11/2002 | Azzam |
| 2010/0107145 | A1 | 4/2010 | Warren et al. |
| 2011/0055264 | A1 | 3/2011 | Sundelin et al. |

(Continued)

FOREIGN PATENT DOCUMENTS

WO   2011151500 A1   12/2011

OTHER PUBLICATIONS

Yadav, et al., "Profit Maximizing Approach in Data Mining Using Modified Weighted Association Rule Mining Algorithm", In International Journal of Computer Science & Information Technology Research Excellence vol. 3, Issue 3, May 2015, pp. 8-17.

(Continued)

*Primary Examiner* — Cheryl Lewis
(74) *Attorney, Agent, or Firm* — Workman Nydegger

(57) ABSTRACT

Analyzing data. A method includes obtaining a set of a plurality of data entities and relationships. The method further includes subdividing the set of a plurality of data entities and relationships into a plurality of composite collections of data entities and relationships. Each composite collection within the plurality of composite collections disambiguates the composite collection, within a relationship scope, from ambiguities in the set of a plurality of data entities and relationships. The method further includes providing one or more of the plurality of composite collections of data entities and relationships to a data mining engine. Each composite collection of data entities and relationships is provided as a separate unit to the data mining engine.

20 Claims, 14 Drawing Sheets

(56) References Cited

U.S. PATENT DOCUMENTS

2012/0254251 A1    10/2012  Barbosa et al.
2014/0136184 A1*    5/2014  Hatsek .................. G06F 17/278
                                                       704/9

OTHER PUBLICATIONS

Chowdhury, et al., "BOSTER: An Efficient Algorithm for Mining Frequent Unordered Induced Subtrees", In Proceedings of 15th International Conference on Web Information System Engineering, Oct. 12, 2014, 4 pages.

Tan, et al., "Tree Model Guided Candidate Generation for Mining Frequent Subtrees from XML Documents", In Journal ACM Transactions on Knowledge Discovery from Data, vol. 2, Issue 2, Jul. 2008, 43 pages.

Melville, et al., "Social Media Analytics: Channeling the Power of the Blogosphere for Marketing Insight", In Proceedings of Workshop on Information in Networks, Sep. 2009, 5 pages.

Vezzosi, Pierpaolo, "Analytics from SAP", Published Date: Oct. 22, 2015 Available at: http://blogs.sap.com/analytics/2015/10/22/using-exploratory-analytics-to-find-that-needle-in-the-data-haystack/.

Mary, "Quickly get insights on a spreadsheet using Explore", Published on: Sep. 6, 2015 Available at: https://support.google.com/docs/answer/6280499?hl=en.

* cited by examiner

EXTRACT METADATA FROM DATASETS TO MINE DATA FOR INSIGHTS

BACKGROUND

Background and Relevant Art

Computers and computing systems have affected nearly every aspect of modern living. Computers are generally involved in work, recreation, healthcare, transportation, entertainment, household management, etc.

Computing system can be used in data mining applications. Data applications receive datasets and attempt to analyze the data to generate insights on the datasets. For example, a dataset related to e-commerce may have data mining performed to identify product popularity by customer zip code, or some other insight. When interfacing with a data mining system to automatically generate insights on a dataset, it may be important to determine portions of the dataset that are most likely to result in useful insights. Additionally, data mining systems have been limited in the portions of the datasets able to be analyzed. In particular, data mining systems have been able to analyze individual data portions (such as a data node in a data graph), but have not been able to analyze a set of individual portions together because of potential conflicts and/or ambiguities.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method for analyzing data. The method includes obtaining a set of a plurality of data entities and relationships. The method further includes subdividing the set of a plurality of data entities and relationships into a plurality of composite collections of data entities and relationships. Each composite collection within the plurality of composite collections disambiguates the composite collection, within a relationship scope, from ambiguities in the set of a plurality of data entities and relationships. The method further includes providing one or more of the plurality of composite collections of data entities and relationships to a data mining engine. Each composite collection of data entities and relationships is provided as a separate unit to the data mining engine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments of the invention illustrated herein can subdivide a dataset (where the dataset includes data entities and relationships between data entities) having ambiguities into subsets (referred to herein as composite collections) without ambiguities for given relationship scope. Once a subset with no ambiguities has been created, the subset can be provided to a data mining engine which is able to analyze the particular subset. In some embodiments, several different subsets, without ambiguities for a given relationship scope, can each be created and analyzed by the data mining engine. The results of each analysis by the data mining engine can be aggregated into a composite result.

Figure 1:
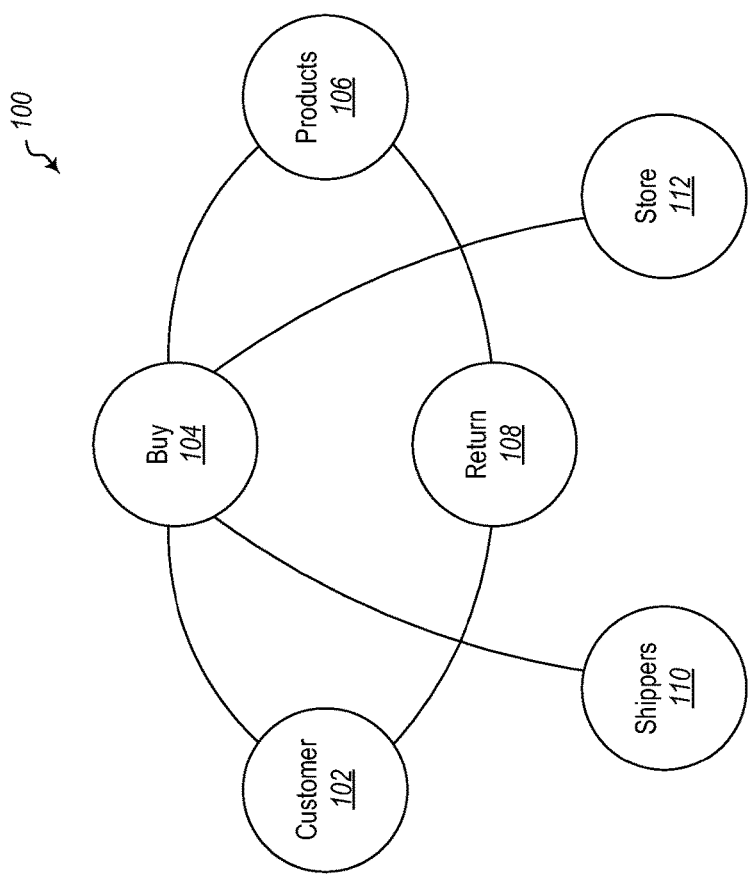
FIG. 1 illustrates a graph illustrating a dataset.
Figure 2A:
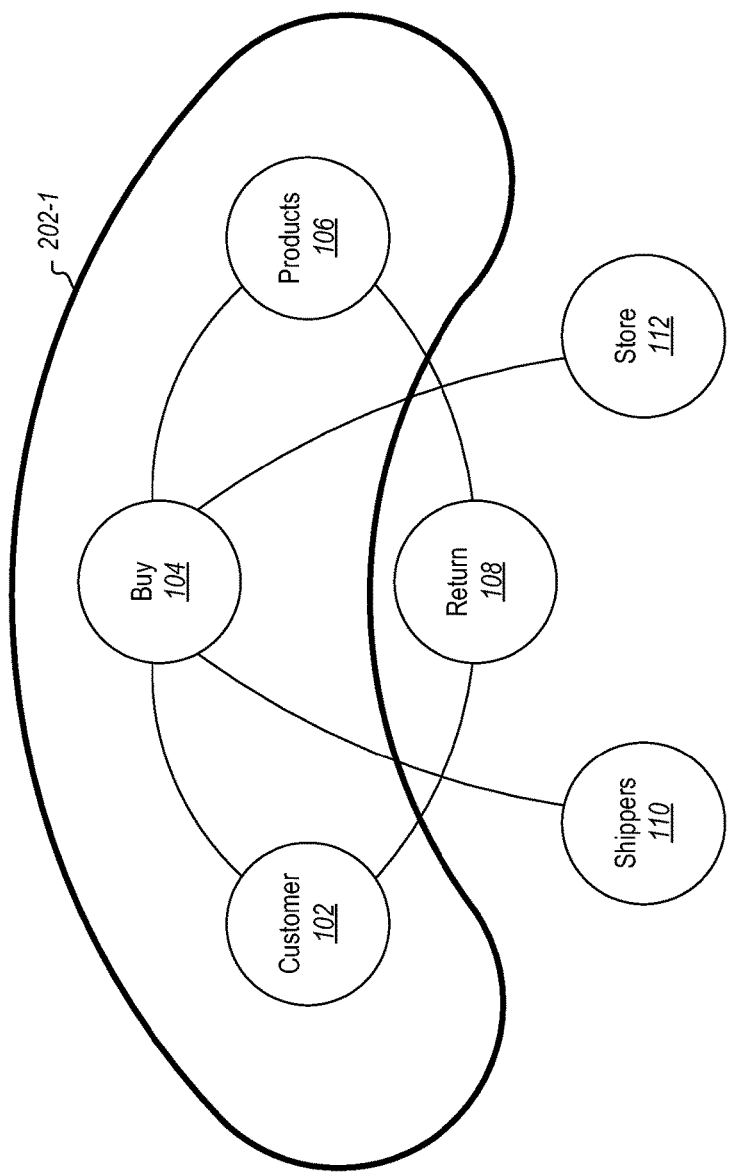
FIG. 2A illustrates a graph illustrating a dataset and a subdivision of the dataset illustrated as a composite collection.
Figure 2B:
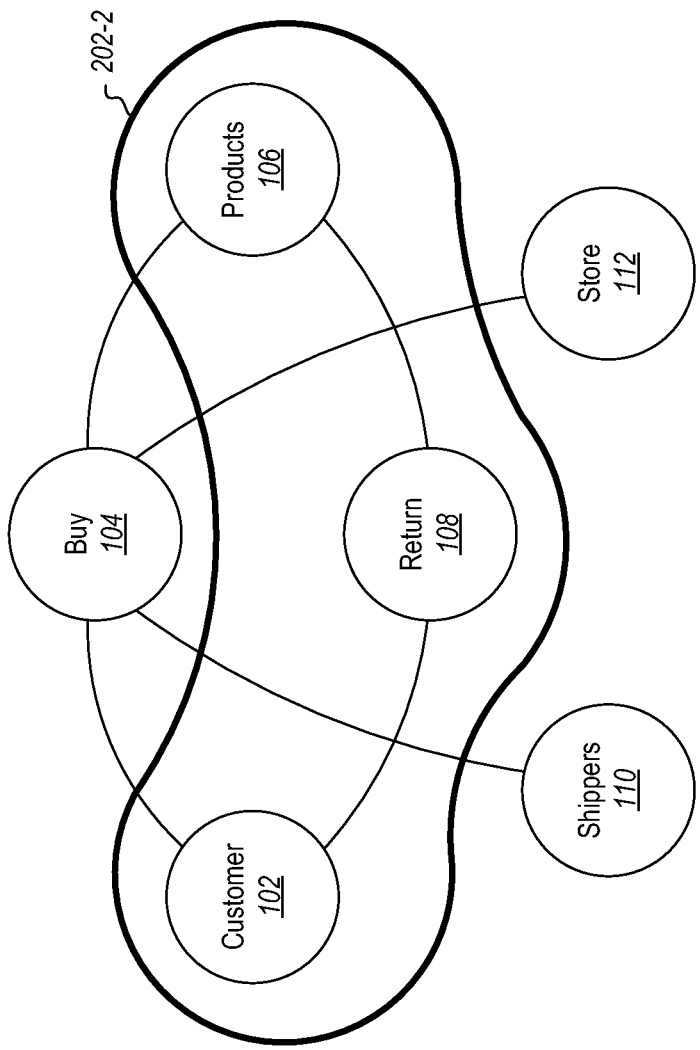
FIG. 2B illustrates a graph illustrating a dataset and a subdivision of the dataset illustrated as a composite collection.
Figure 2C:
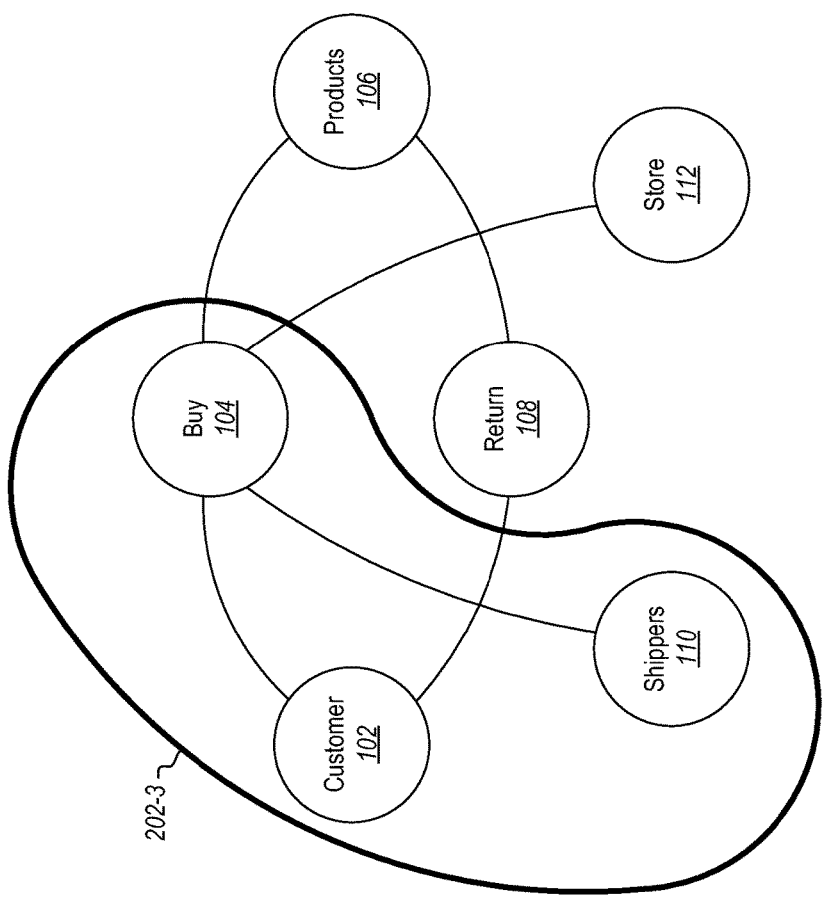
FIG. 2C illustrates a graph illustrating a dataset and a subdivision of the dataset illustrated as a composite collection.
Figure 2D:
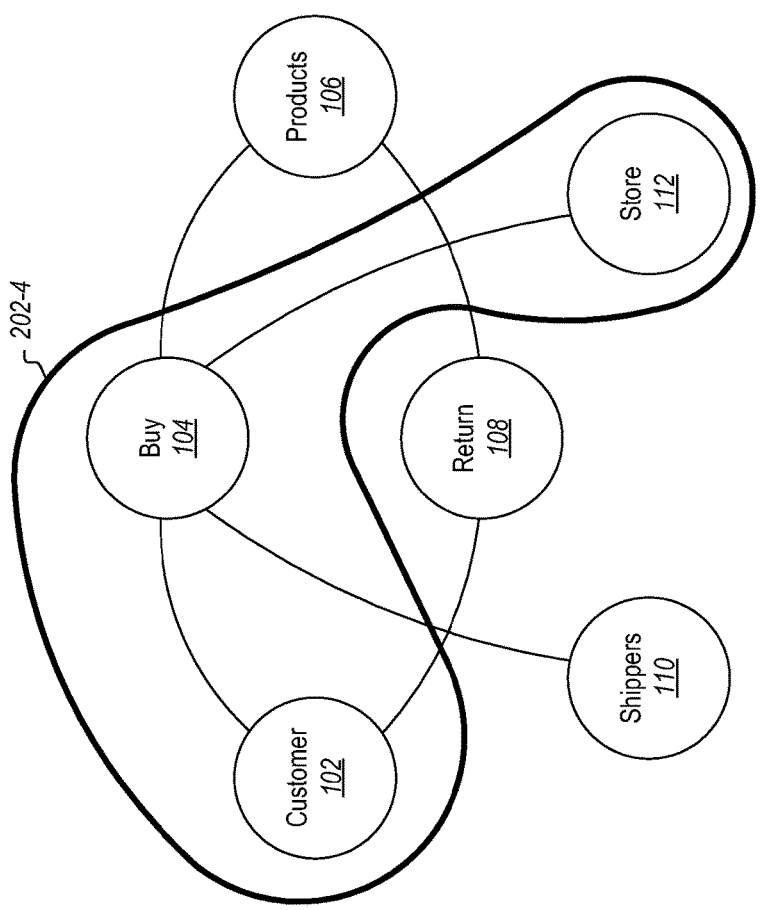
FIG. 2D illustrates a graph illustrating a dataset and a subdivision of the dataset illustrated as a composite collection.
Figure 2E:
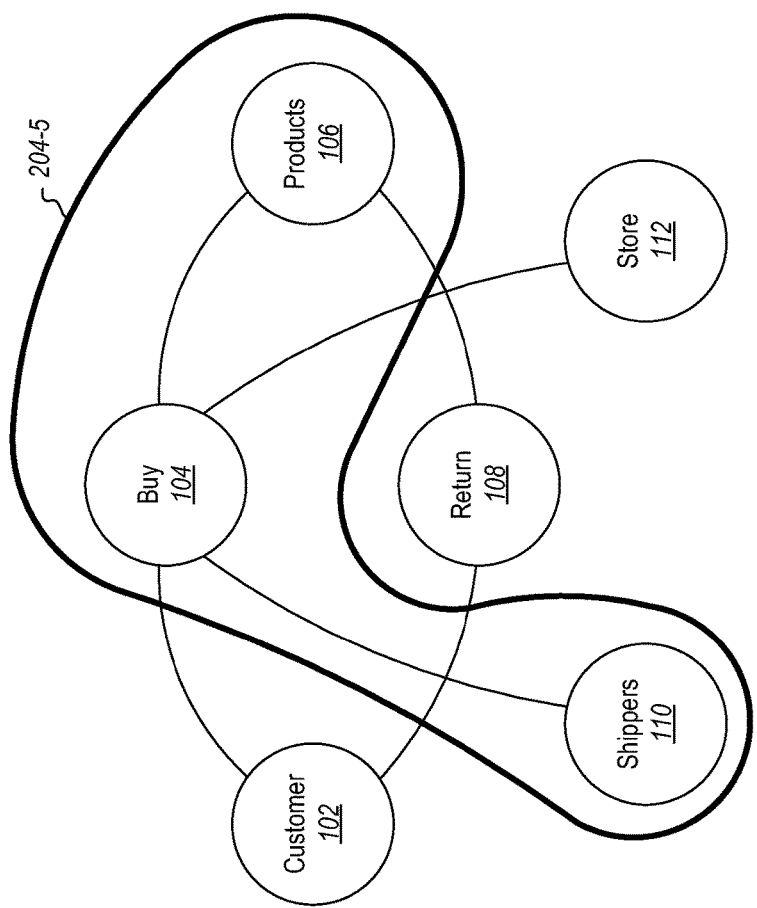
FIG. 2E illustrates a graph illustrating a dataset and a subdivision of dataset illustrated as a composite collection.
Figure 2F:
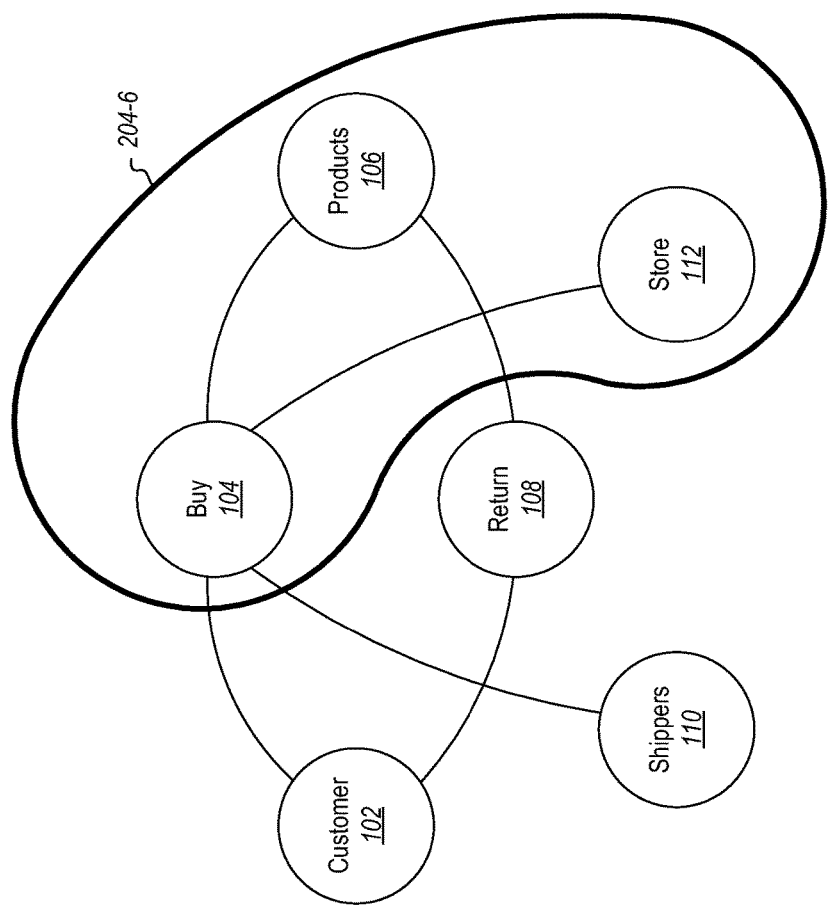
FIG. 2F illustrates a graph illustrating a dataset and a subdivision of the dataset illustrated as a composite collection.

For example, consider the graph 100 illustrated in FIG. 1, which represents a dataset. The graph includes a customer node 102 coupled to a buy node 104, which is in turn coupled to a products node 106. The customer node 102 is also coupled to a return node 108, which is in turn coupled to the products node 106.

The customer node 102 includes data about customers. The information may be, for example, contained in a database table. However, in other embodiments, the information may be a simple list, flat file, or other data "bucket". The information in the customer node 102 may include information such as names, addresses, telephone numbers, socio-economic status, etc., about buyers of various products.

Similarly, the product node 106 may contain data about products bought or returned by customers as represented by the customer node 102. The products node 106 may include information such as product model numbers, product names, product attributes (such as color, weight, dimensions, eta etc.

The buy node 104 may include information about how products were purchased and/or delivered to a customer.

The return node 108 may include information about how products are returned by a customer.

FIG. 1 further illustrates a shippers node 110 coupled to the buy node 104. The shippers node 110 includes information about various shippers that ship purchased products.

FIG. 1 further illustrates a store node 112 coupled to the buy node 104. The store node 112 may include information about stores from which customers buy products.

The nodes (representing data entities) are interconnected by relationships, represented as graph edges.

If all six of these nodes 102, 104, 106, 108, 110, and 112, and all of their edges are presented to a data mining system, the data mining systems may not be able to handle contextual information. For example, the data mining system may not be able to disambiguate whether a transaction by a customer is a 'buy' transaction or a 'return' transaction. Rather, the transactions will be treated identically. Thus, when this data is analyzed, the insights obtained from the analysis may have inherent ambiguities in the results. Thus for example, an insight may be obtained about products that are red, but that insight will have both buy and return details without disambiguating between the two.

However, the graph 100 could be subdivided into a plurality of composite collections, where each composite collection includes a subset of the data entities and relationships. Each composite collection is selected such that each composite collection is disambiguated for a relationship scope. Thus, for example, as illustrated in FIGS. 2A-2F, the data entities and relationships illustrated by the graph 100 in FIG. 1 are subdivided into six different composite collections 202-1, 202-2, 202-3, 202-4, 202-5, and 202-6, as illustrated in FIG. 2A-2F. Each of these composite collections is non-ambiguous for a particular relationship scope. A composite collection is disambiguated by analyzing the relationships between two entities (1-to-1, 1-to-many, many-to-many), starting at a given entity, and including those entities that are connected directly or indirectly through a relationship. This is done by traversing the graph of relationships in the model. An entity may be related to more than one other entity and therefore may be included in multiple composite collections.

Figure 3:
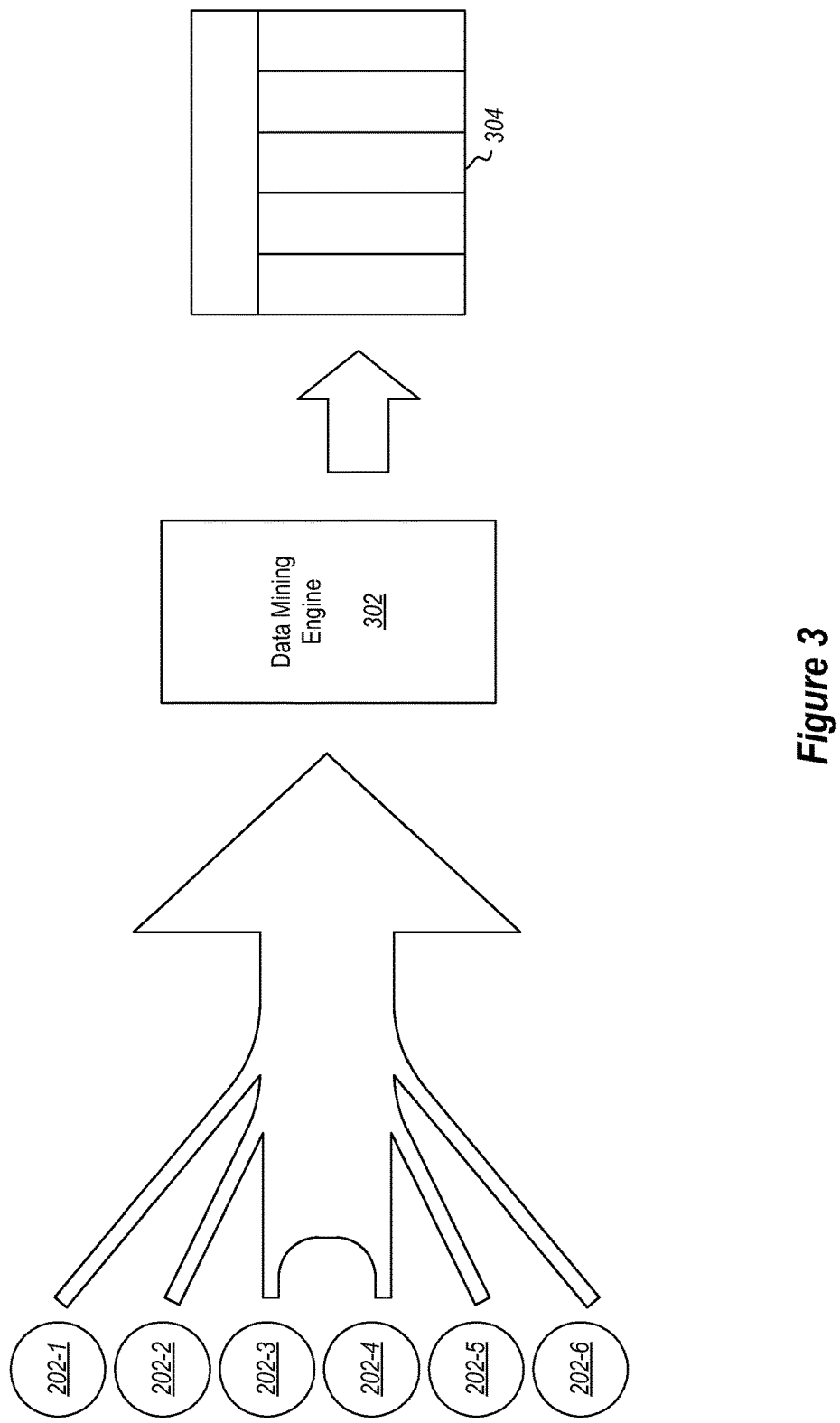
FIG. 3 illustrates composite collections being provided to a data mining engine.

As illustrated in FIG. 3, the different composite collections 202-1, 202-2, 202-3, 202-4, 202-5, and 202-6 could then be provided to a data mining engine 302 where insights 304 could be extracted from the composite collections. The data mining engine 302, may be, for example, Microsoft Azure Machine Learning, now part of Microsoft Cortana Analytics Suite, available from Microsoft Corporation of Redmond, Wash. The insights 304 may be collected and presented in database tables, flat files, or other data representations.

Note that certain composite collections may be more useful for generating insights than other composite collections. Thus, it can be useful when interfacing with a data mining system to automatically identify the composite collections of the dataset that are most likely to result in useful insights. Choosing the right heuristics and/or taking into account user input can be used to prioritize and filter dataset composite collections (and in some embodiments, elements of composite collections) and generate a set of insights that are diverse and have a high likelihood of usefulness to users. Thus, embodiments may be implemented to find data elements in a dataset that are the most likely to deliver interesting insights when running automated analytics.

Starting with a relational graph of a data model, the graph can be organized into sub-trees (i.e., composite collections). These composite collections are analyzed for elements that are most likely to generate interesting and/or relevant insights or uninteresting and/or confusing insights, with the former prioritized and the latter pruned. Thus for example, in the example shown in FIG. 3, the composite collections 202-1, 202-2, 202-3, 202-4, 202-5, and 202-6 can be analyzed to determine which of the composite collections are likely to produce valuable insights, and which are likely to produce less valuable insights, or even confusing and deleterious insights.

An insight is interesting or relevant if the user viewing the insight finds it useful in better understanding the underlying data. Embodiments may use a topic to value the relevance/interest value of an insight. The topic can be directly specified by the user, inferred from past interactions the user had with the system, determined from the context in which the user requested insights (e.g. if the user requests insights from an existing chart, using the entities of the chart), etc. Embodiments can most easily ascertain the value of an insight based on the action(s) that the user takes on it. For example, a user may decide to zoom in on an insight to better understand details, add an insight to a dashboard to track behavior as data continues to change, incorporate an insight into an email to share with colleagues, and/or include an insight in an entry on a social media application to share more broadly.

The composite collections, which are mined separately, are weighted on various factors. For example, the composite collections may be weighted based on one or more of number of elements in a composite collection, estimated size of resulting data to be mined, amount of intersection with other composite collections, user input selecting elements of composite collections (or entire composite collections) that are most interesting to them, telemetry from users' prior selection and/or use of insights, etc.

The composite collections can be prioritized with respect to the data mining engine 302. For example, composite collections can be prioritized by order to run on the data mining engine, with composite collections that are likely to yield more useful insights according to some predetermined criteria being run on the data mining engine 304 first.

Alternatively or additionally, composite collections may be provided to the data mining engine 302 in a way that that will yield the most useful insights when there are resource constraints associated with the data mining engine 302. For example, the fact that resources are limited (e.g., compute, memory, storage, and/or network resources have finite capacities) may limit how many composite collections and elements are capable of being mined for insights. As such, by identifying the composite collections and elements that are likely to yield more useful insights according to predetermined criteria, those composite collections and/or elements can be provided to the data mining engine 304 while other composite collections and/or elements are elided or excluded.

As part of a data mining process, there can also be further analysis of composite collections and/or elements to more effectively prune and prioritize the resulting insights. For example, as data mining occurs, the composite collections and/or elements that are prioritized, or that are selected to be analyzed (or selected to be excluded) may change over time as insights are generated and analyzed by a user, as user's actions indicate that certain insights are more useful, etc. For example, the system may identify that a user selects insights more often (or even exclusively) that are generated based on analyzing certain composite collections and/or elements. As a result, the system may prioritize such composite collections and/or elements (or similar composite collections and/or elements) when selecting which composite collections and/or elements to provide to the data mining engine 304 in the future. Similarly, a user may explicitly identify which composite collections and/or elements to be used, or may rank or rate composite collections and/or elements which may be used to select and/or prioritize which composite collections and/or elements are provided to the data mining engine 304.

In some embodiments, the results of each sub-tree composite collection mined are then combined into a single set of insights.

Figure 4A:
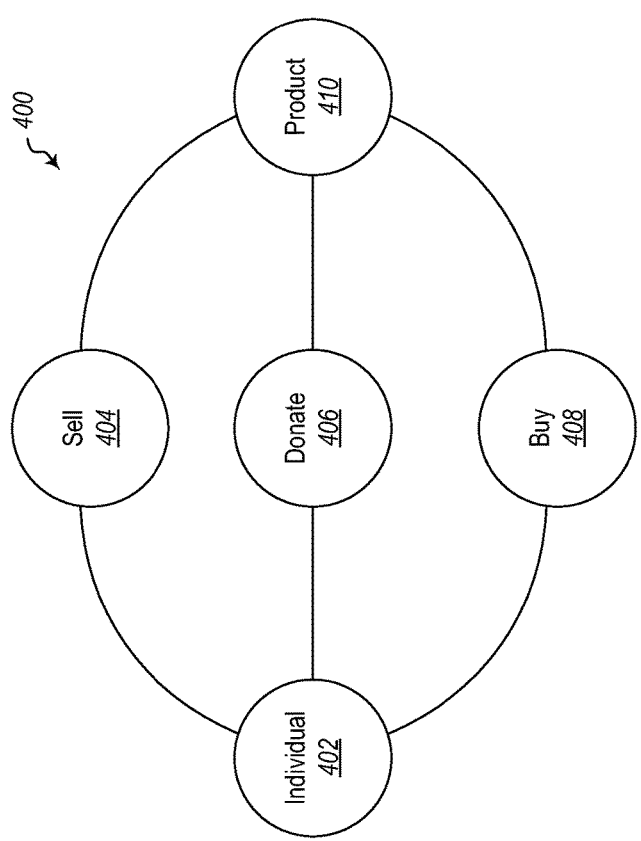
FIG. 4A illustrates a graph illustrating a dataset.

Note that in some embodiments, certain data entities from a data set can be combined into a representation of a single data entity in a composite collection if ambiguities can be removed. For example, FIG. 4A illustrates a graph 400. The graph 400 includes an individual node 402, a sell node 404, a donate node 406, a buy node 408, a product node 410, and various edges connecting the nodes. The graph can be used to illustrate how individuals can buy, donate, and/or sell products.

Figure 4B:
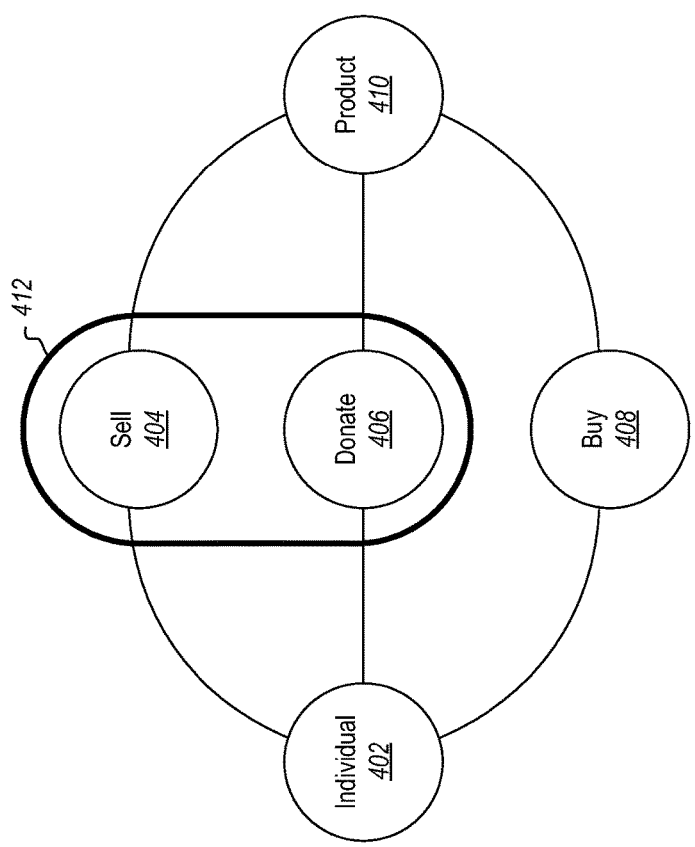
FIG. 4B illustrates a graph with nodes combined into a composite node.
Figure 4C:
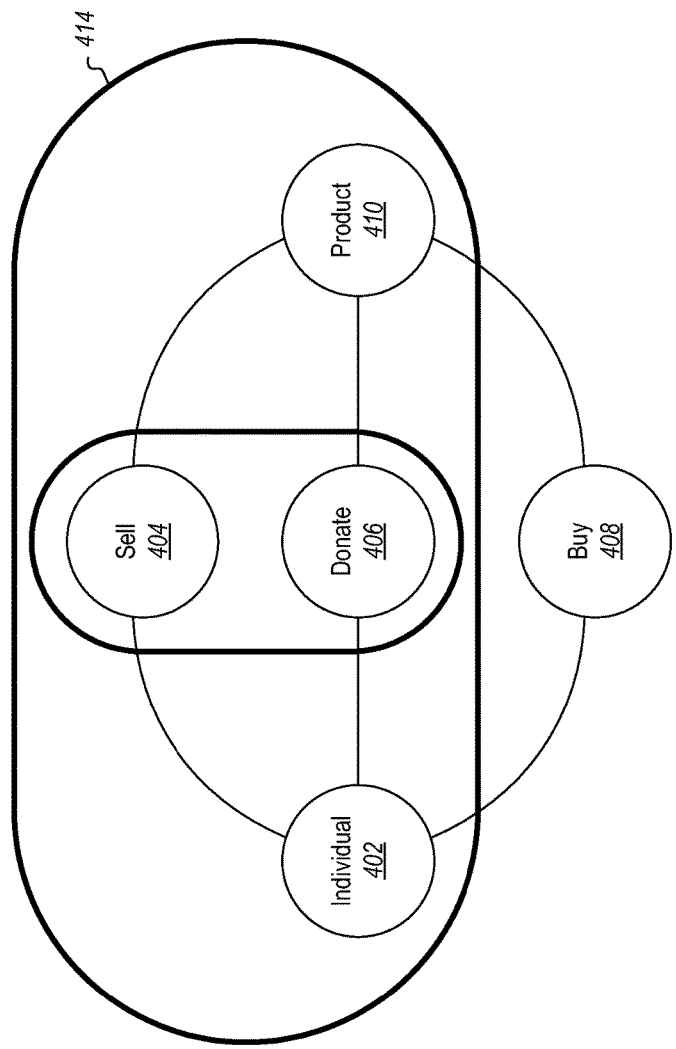
FIG. 4C illustrates a composite collection defined using a composite node.
Figure 4D:
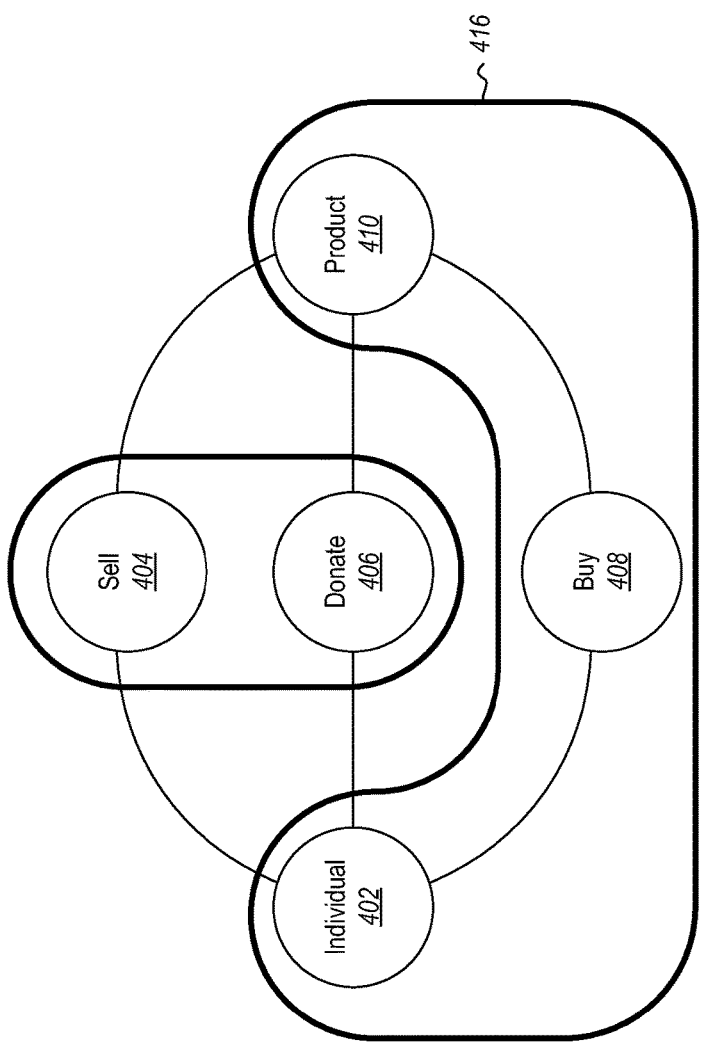
FIG. 4D illustrates another composite collection.

Referring now to FIG. 4B, an example is illustrated where the sell node 404 and donate node 406 are combined into a divest node 412. The divest node 412 can be used to define a composite collection 414 (see FIG. 4C) demonstrating the divestment of products from individuals. As illustrated in FIG. 4D, an acquisition composite collection 416 can be defined to demonstrate the acquisition of products by individuals. Each of these composite collections 414 and 416 is disambiguated from the perspective of whether products are acquired or divested. The composite collections 414 and 416 can be provided to the data mining engine 302 (see FIG. 3), which can then provide insights 304 with respect to these composite collections.

Figure 5:
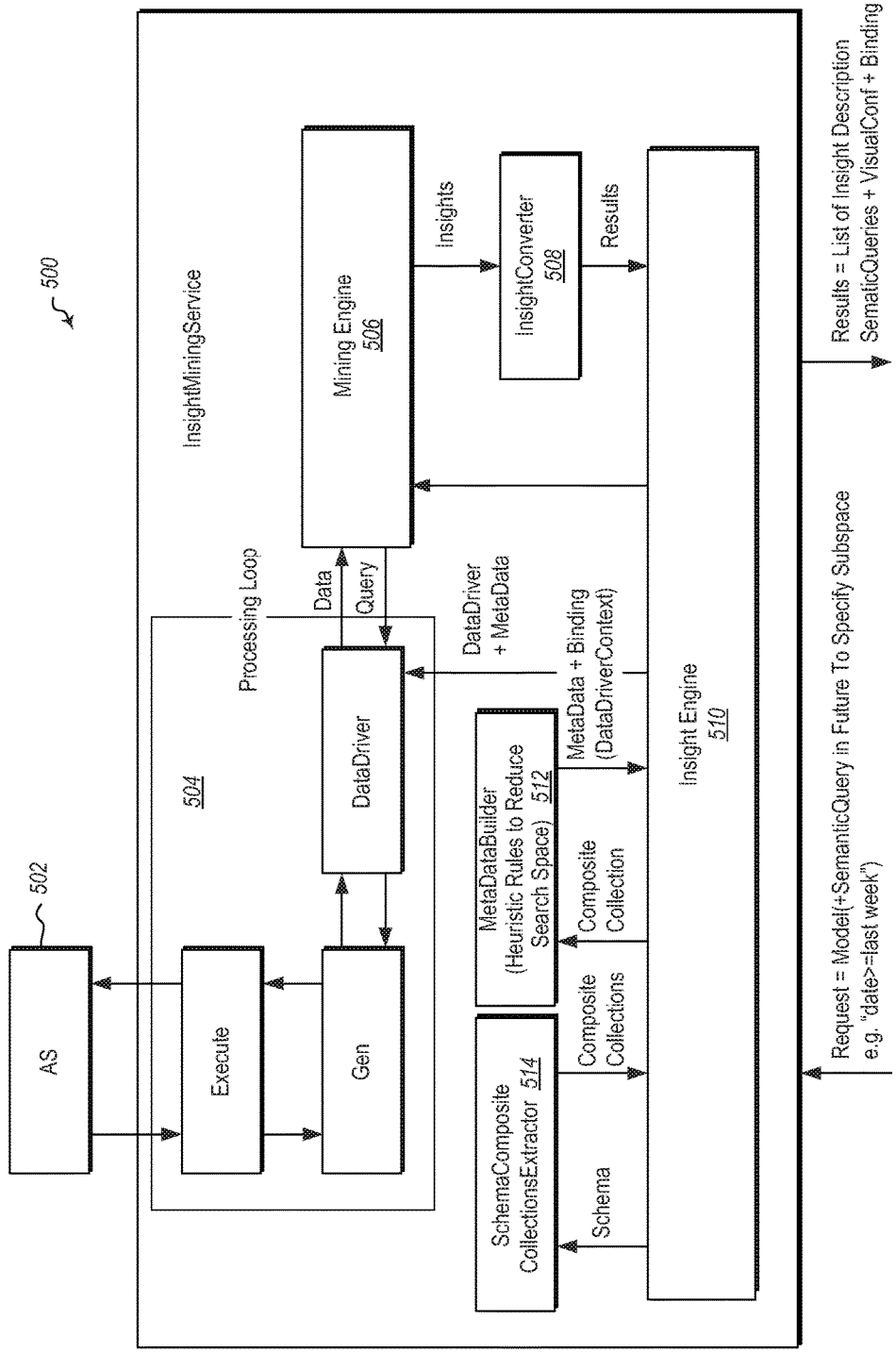
FIG. 5 illustrates an architecture diagram.

Referring now to FIG. 5, an architecture diagram shows an example system 500. The system 500 includes an online analytical processing and data mining system 502. This system 502 allows users to design, create, and visualize data mining models that are constructed from other data sources by using a wide variety of data mining algorithms, which may include industry-standard data mining algorithms. This system could be, for example, the Analysis Services system (AS), available from Microsoft Corporation of Redmond, Wash.

The online analytical processing and data mining system 502 is coupled to a data models and calculations system 504. This system 504 provides tools for allowing users to develop data models and calculations. Such a system may be implemented using Power Pivot and the Data Analysis Expression (DAX) formula language available from Microsoft Corporation of Redmond, Wash. The data models and calculations system 504 is configured to obtain a set of a plurality of data entities and relationships and to subdivide the set of a plurality of data entities and relationships into a plurality of composite collections of data entities and relationships. Each composite collection within the plurality of composite collections disambiguates the composite collection, within a relationship scope, from ambiguities in the set of a plurality of data entities and relationships.

The data models and calculations system 504 is coupled to a mining engine 506. The mining engine 506 receives the composite collections as input, and generates insights using the data models and calculations provided by the data models and calculations system 504. The mining engine 506 may be, for example, the Microsoft Cortana Analytics Suite available from Microsoft Corporation of Redmond, Wash.

The mining engine 506 provides insights to an insight converter 508. The insight converter 508 creates results from the insights. Such results include an aggregation of insights. For example, the results may compare and/or contrast the insights. The results may combine insights. Etc.

The insight converter 508 may provide the results to an insight engine 510. The insight engine 510 calls the schema composite collection extractor 514 to convert a schema into a list of composite collection, where each composite collection includes entities and relationships (and corresponding metadata). The insight engine 510 then calls the metadata builder 512 with the list of composite collections to weight and re-order the composite collections using heuristics that prioritize items most likely to yield interesting insights when run by a mining engine. The insight engine 510 then parallelizes the execution for mining each composite collection by building a composite collection configuration queue and assigning a single composite collection engine to derive the insights from each composite collection.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
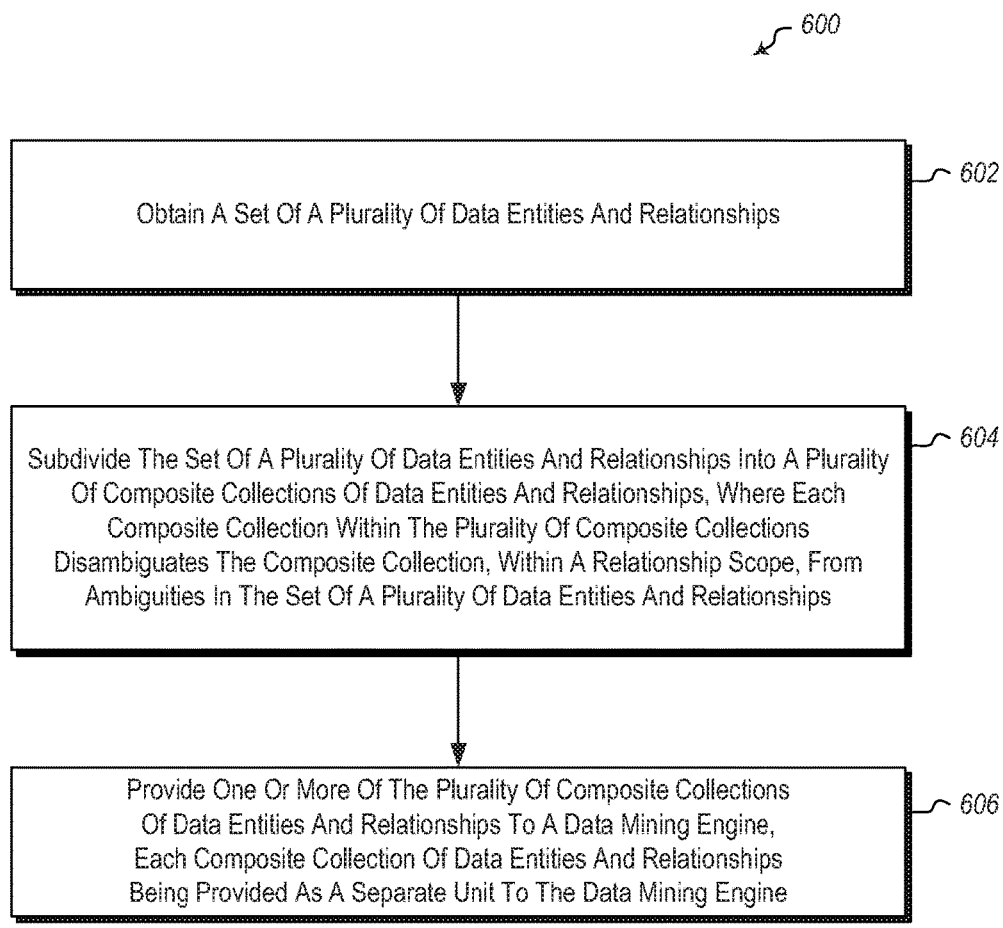
FIG. 6 illustrates a method of analyzing data.

Referring now to FIG. 6, a method 600 is illustrated. The method 600 includes acts for analyzing data. The method. 600 includes obtaining a set of a plurality of data entities and relationships (act 602). For example, a system, such as system 500 illustrated in FIG. 5, may obtain a representation of a graph, such as the graph 100 illustrated in FIG. 1. The graph 100 is a set of a plurality of data entities (nodes) and relationships (edges).

The method 600 further includes subdividing the set of a plurality of data entities and relationships into a plurality of composite collections of data entities and relationships, where each composite collection within the plurality of composite collections disambiguates the composite collection, within a relationship scope, from ambiguities in the set of a plurality of data entities and relationships (act 604). For example, FIG. 2A through 2F illustrate various composite collections 204-1 through 204-6 that can be created by the system 500 (see FIG. 5) by subdividing the graph 100.

The method 600 further includes providing one or more of the plurality of composite collections of data entities and relationships to a data mining engine, each composite collection of data entities and relationships being provided as a separate unit to the data mining engine (act 606). For example, as illustrated in FIG. 3, each of the composite collections 202-1 through 202-6 are provided as separate entities to the data mining engine 302.

The method 600 may be practiced where each of the data entities comprises one or more of a table, a list, a file, or a bucket. For example, each of the nodes of the graph 100 may represent a table, list, file, or other data container.

The method 600 may further include ranking each of the composite collections in the plurality of composite collections. For example, ranking each of the composite collections may be used to determine at least one of an order of processing of each of the composite collections by the data mining engine, which composite collections are provided to the data mining engine for processing (and, potentially which are excluded), an amount of resources allocated to processing a composite collection (e.g., number of processors used for processing a composite collection, number of virtual machines or amount of virtual machine resources used to process a composite collection, time allotted to resources for processing a composite collection, network resources used for processing a composite collection, number of coefficients used by a data processing routine in a data mining engine, etc.).

Ranking each of the composite collections may be performed in a number of different ways. For example, in some embodiments, ranking composite collections may be performed using heuristics. Examples of heuristics that may be used include: the number of entities; the number of items within each entity; the number of measures (calculations and aggregates) within each entity; the relative breadth of datatypes for items within each entity; the topic (specified by the user or interpreted by the system based on context or prior insights); the relationships between entities, dimensions, and measures—whether explicit or inferred—which determine functional dependencies; etc.

Alternatively or additionally, ranking the results may be performed using a feedback loop including using information about how the results are used by a user.

In some embodiments, the method 600 may be performed to further include, within an entity, ranking or filtering portions of the entity. Thus, for example, an entity as represented by a node, may have data that can be filtered and/or ranked. For example, an entity may include a plurality of different zip codes for various individuals. Embodiments may rank zip codes for order of processing. Alternatively, in another example, embodiments may only use certain zip codes while filtering out other zip codes in an entity.

The method 600 may further include receiving results from the data mining engine for a plurality of composite collections and aggregating the results. For example, aggregating results may include comparing the results and providing an indication of the similarities or differences of the results of performing data mining between different composite collections. Alternatively or additionally, aggregating results may include sorting and/or prioritizing the results according to a predefined criteria or metric. Alternatively or additionally, aggregating results may include combining the results. For example, embodiments may simply display the results from the various data mining operations of the composite collections and combine them into a single result.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
    one or more processors; and
    one or more computer-readable storage devices having stored thereon instructions that are executable by the one or more processors to configure the computer system to analyze data, including instructions that are executable to configure the computer system to perform at least the following:
    obtaining a graph, the graph comprising set of a plurality of data entities and relationships, wherein each data entity represents a node in the graph and each relationship represents an edge connecting a node in the graph to another node in the graph;
    identifying a plurality of composite collections of data entities and relationships, each of the plurality of composite collections comprising a subset of the set of a plurality of data entities and relationships, each of the plurality of composite collections comprising a sub-tree of the graph which includes nodes and edges of the graph within a particular relationship scope, and each composite collection of the plurality of composite collections being identified by traversing the graph, beginning at a particular entity for each composite collection and including each entity connected through a connecting relationship associated with the particular relationship scope, and analyzing the associated connecting relationships; and
    providing one or more of the plurality of composite collections of data entities and relationships to a data mining engine, each composite collection of data entities and relationships being provided individually, each as a separate unit to the data mining engine.

2. The system of claim 1, wherein each of the data entities comprises one or more of a table, a list, a file, or other data container.

3. The system of claim 1, wherein one or more computer-readable media further have stored thereon instructions that are executable by the one or more processors to configure the computer system to rank each of the composite collections in the plurality of composite collections.

4. The system of claim 1, wherein one or more computer-readable media further have stored thereon instructions that are executable by the one or more processors to configure the computer system to rank or filter portions of the entity before providing the entity to the data mining engine as part of a composite collection.

5. The system of claim 1, wherein one or more computer-readable media further have stored thereon instructions that are executable by the one or more processors to configure the computer system to rank the results using a feedback loop including using information about how the results are used by a user.

6. The system of claim 1, wherein one or more computer-readable media further have stored thereon instructions that are executable by the one or more processors to configure the computer system to receive results from the data mining engine for a plurality of composite collections and aggregate.

7. A method of analyzing data, the method performed by executing computer-executable instructions upon one or more computer processors of a computing system, the method comprising:
    obtaining a graph, the graph comprising set of a plurality of data entities and relationships, wherein each data entity represents a node in the graph and each relationship represents an edge connecting a node in the graph to another node in the graph;
    identifying a plurality of composite collections of data entities and relationships, each of the plurality of composite collections comprising a subset of the set of a plurality of data entities and relationships, each of the plurality of composite collections comprising a sub-tree of the graph which includes nodes and edges of the graph within a particular relationship scope, and each composite collection of the plurality of composite collections being identified by traversing the graph, beginning at a particular entity for each composite collection and including each entity connected through a connecting relationship associated with the particular relationship scope, and analyzing the associated connecting relationships; and
    providing one or more of the plurality of composite collections of data entities and relationships to a data mining engine, each composite collection of data entities and relationships being provided individually, each as a separate unit to the data mining engine.

8. The method of claim 7, wherein each of the data entities comprises one or more of a table, a list, a file, or other data container.

9. The method of claim 7, further comprising ranking each of the composite collections in the plurality of composite collections.

10. The method of claim 9, wherein ranking each of the composite collections is used to determine at least one of an order of processing of each of the composite collections by the data mining engine, which composite collections are provided to the data mining engine for processing, which composite collections are prevented from being provided to the data mining engine, or an amount of resources allocated to processing a composite collection.

11. The method of claim 9, wherein ranking each of the composite collections is performed using heuristics.

12. The method of claim 9 further comprising, within an entity, at least one of ranking or filtering portions of the entity before providing the entity to the data mining engine as part of a composite collection.

13. The method of claim 9, further comprising ranking the results using a feedback loop including using information about how the results are used by a user.

14. The method of claim 7, further comprising, receiving results from the data mining engine for a plurality of composite collections and aggregating the results.

15. The method of claim 14, wherein aggregating comprises comparing the results.

16. The method of claim 14, wherein aggregating comprises prioritizing the results.

17. The method of claim 14, wherein aggregating comprises combining the results.

18. A computing system for analyzing data, the system comprising one or more computer processors and system memory, the system further comprising:
   a data models and calculation system configured to
      obtain a graph, the graph comprising set of a plurality of data entities and relationships, wherein each data entity represents a node in the graph and each relationship represents an edge connecting a node in the graph to another node in the graph,
      identify a plurality of composite collections of data entities and relationships, each of the plurality of composite collections comprising a subset of the set of a plurality of data entities and relationships, each of the plurality of composite collections comprising a sub-tree of the graph which includes nodes and edges of the graph within a particular relationship scope, and
      subdivide the set of a plurality of data entities and relationships into a the plurality of composite collections of data entities and relationships, where each composite collection of the plurality of composite collections is identified by traversing the graph, beginning at a particular entity for each composite collection and including each entity connected through a connecting relationship associated with the particular relationship scope, and analyzing the associated connecting relationships; and
   a data mining engine coupled to the data models and calculation system, wherein the data mining engine receives one or more of the plurality of composite collections of data entities and relationships and is configured to generate insights from the composite collection.

19. The system of claim 18, further comprising an insight engine coupled to the data mining engine, wherein the insight engine is configured to aggregate insights.

20. The system of claim 18, further comprising a metadata builder coupled to the insight engine, wherein the metadata builder is configured to perform at least one of prioritizing or filtering composite collections.

* * * * *